June 12, 1928.  
E. WILDHABER  
1,673,540  
METHOD OF PRODUCING HYPOID GEARS  
Filed May 10, 1926   5 Sheets-Sheet 1

INVENTOR  
*Ernest Wildhaber*  
BY  
ATTORNEY

June 12, 1928. 1,673,540

E. WILDHABER

METHOD OF PRODUCING HYPOID GEARS

Filed May 10, 1926 5 Sheets-Sheet 2

INVENTOR
Ernest Wildhaber
ATTORNEY

June 12, 1928.  1,673,540
E. WILDHABER
METHOD OF PRODUCING HYPOID GEARS
Filed May 10, 1926   5 Sheets-Sheet 5

INVENTOR
Ernest Wildhaber
BY
ATTORNEY

Patented June 12, 1928.

1,673,540

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

METHOD OF PRODUCING HYPOID GEARS.

Application filed May 10, 1926. Serial No. 108,036.

The present invention relates to gears and to a method of producing the same. In particular the present invention relates to the production of longitudinally curved tooth hypoid gears.

It has been found that it is possible to obtain a smoother finish on the tooth surfaces of generated gears than can be secured where one or both members of a pair are non-generated.

The primary object of this invention, therefore, is to provide a method of producing hypoid gears whereby both members of a pair may be generated.

A further object of the invention is to provide a method of generating a pair of hypoid gears in which both members may be produced with a simple rolling movement on existing machines and without complicated adjustments or added motions.

With the above and other objects in view, the present invention resides in the various novel features peculiar to the new gears and in the various novel steps constituting the new process of producing hypoid gears, which are described hereinafter in the specification, illustrated in the accompanying drawings, and set forth in the appended claims.

With the present invention, each member of a pair of hypoid gears is produced by a generating process in which the blank is rolled relatively to the cutting tool in the manner of a gear rolling with a basic gear, other than its mate, whose pitch surface is a surface of revolution or a plane. The gear or larger member of the pair is preferably produced, according to the present invention, in the same manner as are spiral bevel gears, namely, by a rolling motion between tool and blank in which the tool represents a basic gear whose axis intersects the axis of the blank. The pinion or smaller member of the pair is, preferably, generated by a relative rolling motion between tool and blank consisting of a rotational movement of the blank on its axis and a simultaneous relative movement of translation between tool and blank about an axis offset from the axis of the blank and representing the axis of a basic gear with which the blank is theoretically in mesh. This latter basic gear is preferably a true crown gear, namely, a gear whose pitch surface is a plane. The basic gear employed in producing the larger member of the pair may, also, be a true crown gear, but, preferably, I choose to set the gear blank and tool relatively to each other so that the tool represents a nominal crown gear, that is, a gear having a plane top surface but a conical pitch surface, whereby the gear may be produced on existing types of spiral bevel gear generators.

A preferred construction of gears produced according to the present invention and the preferred method of producing and proportioning such gears is illustrated in the accompanying drawings, in which.

Figure 1:
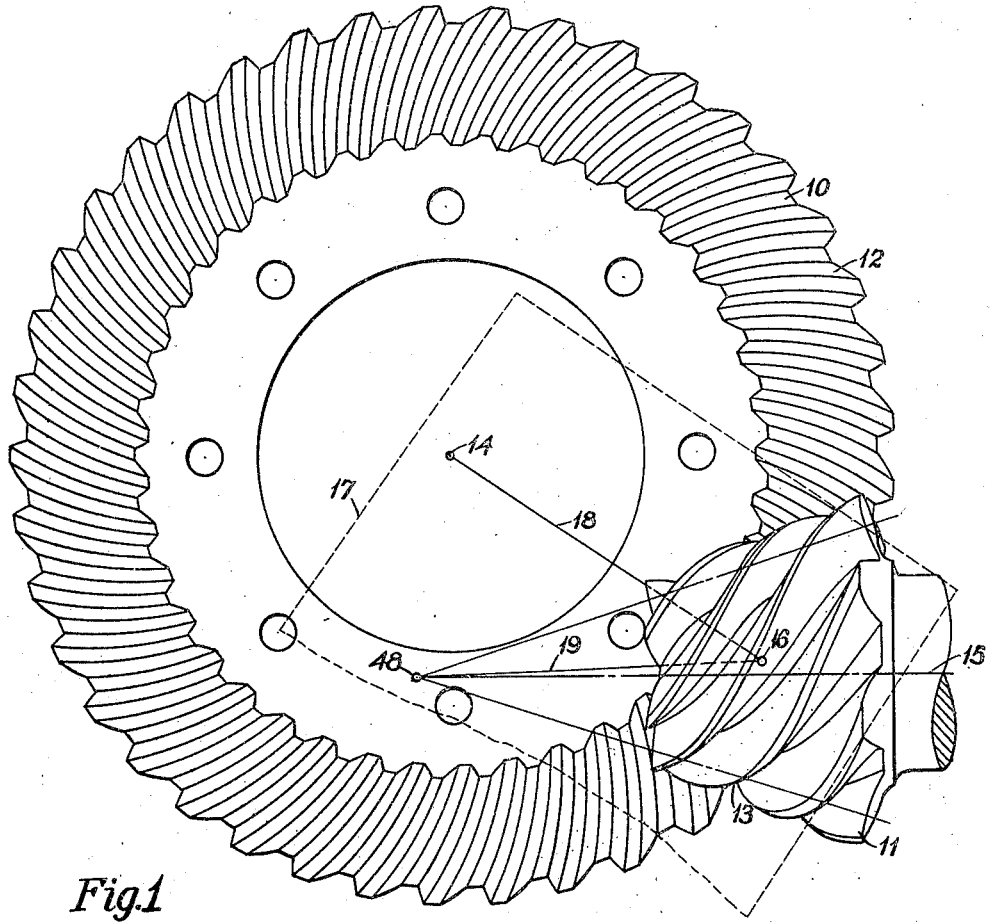
Figures 1 and 2 are a plan view and a side elevation, respectively, of a pair of hypoid gears such as might be produced according to this invention.
Figure 2:
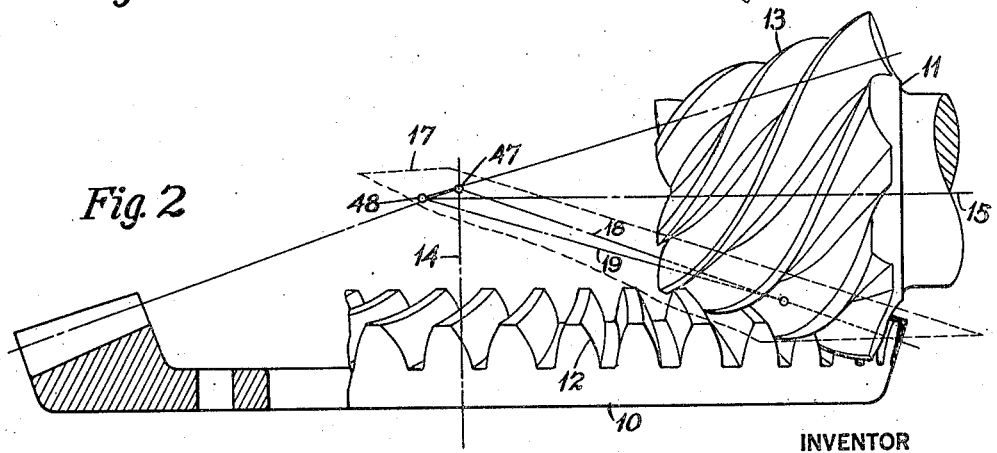

Figures 1 and 2 show a pair of hypoid gears constructed according to a preferred form of this invention. The gear or larger member of the pair is indicated at 10 and the pinion or smaller member of the pair at 11. These gears are provided with longitudinally curved teeth 12 and 13 respectively. They mesh with axes non-intersecting and non-parallel, the pinion axis 15 being off-set from the gear axis 14 and preferably extending between the toothed portion of the gear and its axis 14. In the preferred form of the invention the gears are so arranged that their axis 14 and 15 are disposed at right angles to each other, as seen in Figure 2.

As has been stated, the present invention has for one object the provision of a method whereby both members of a pair of hypoid gears may be produced in a generating process in which the blank is rolled relatively to the cutting tool in the manner of a gear rolling with a basic gear whose pitch surface is a surface of revolution or a plane. According to the preferred method of production, the gear or larger member of the pair is generated in the same manner as a spiral bevel gear by a rolling movement in which the axis of the blank intersects the axis of the basic generating gear, while the pinion is generated by a rolling movement in the manner of a gear meshing with a crown gear with its axis offset from and angularly disposed with reference to the axis of the crown gear.

Figure 3:
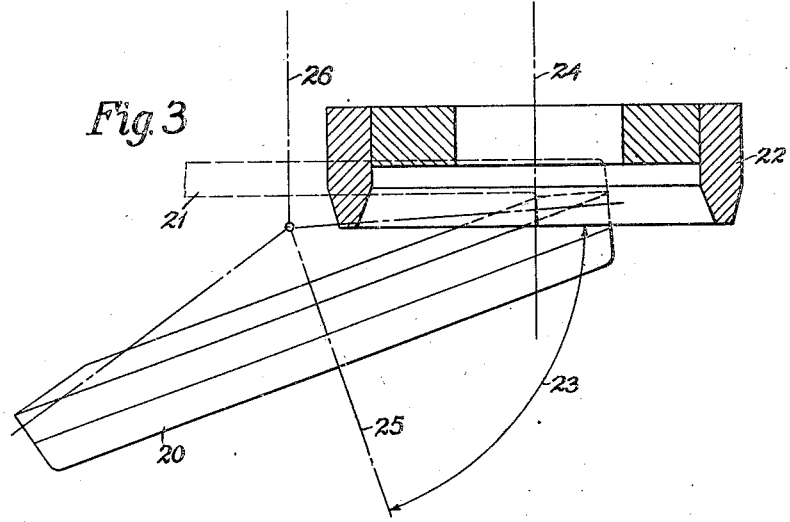
Figure 3 is a diagrammatic view, illustrating the preferred method of producing the gear or larger member of the pair.
Figure 4:
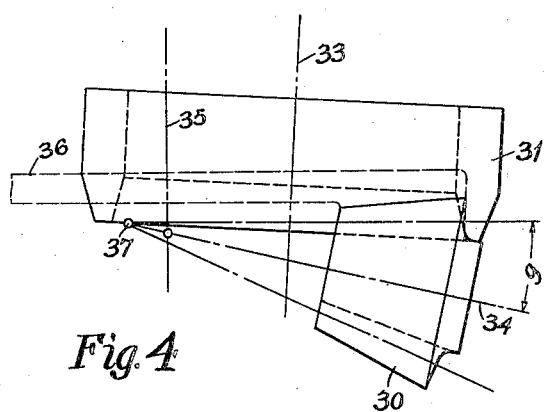
Figures 4 and 5 are a side elevation and a plan view, respectively, illustrating diagrammatically the preferred method of producing the pinion or smaller member of the pair.
Figure 5:
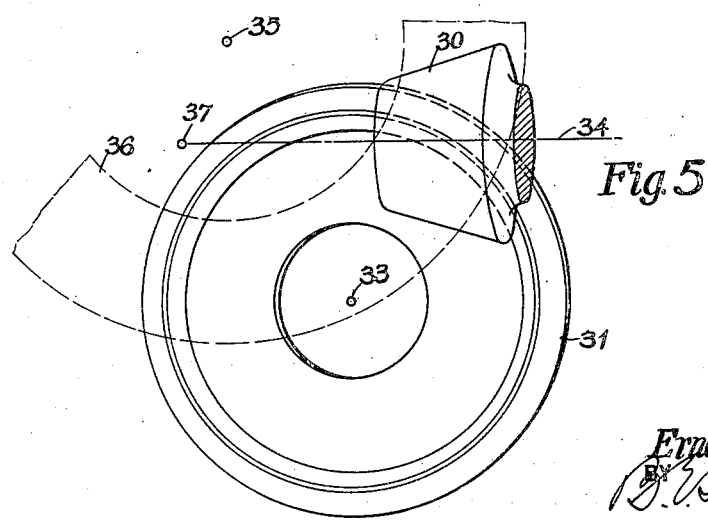

The preferred method of production of the hypoid pair is illustrated in Figures 3 to 5 inclusive. Figure 3 shows diagrammatically the method of producing the gear. The blank is set to its root angle 23 and the cutter which is preferably in the form of a rotary annular face mill is properly set in engagement with the blank. The generation of the tooth surfaces is effected by a rotary movement of the cutter 22 on its axis 24 combined with a rolling movement of the tool and blank relative to each other in the manner of a gear meshing with a basic gear 21 represented by the tool 22. In this rolling movement the blank rotates about its axis 25 and the tool and blank are simultaneously moved relatively to each other about an axis 26 intersecting the axis 25 of the blank and representing the axis of the basic gear 21. In this manner a tooth surface is generated, or where a spread blade cutter is used, a pair of tooth surfaces are generated simultaneously. The blank is then indexed and the next tooth surface or pair of tooth surfaces is generated as before. This alternate cutting and indexing proceeds until all of the tooth surfaces of the blank have been finished. By setting the blank and tool in the manner described and effecting the motions described, the gear may be cut on a Gleason spiral bevel gear generator without modification of that machine.

The preferred method of generating the pinion is illustrated diagrammatically in Figures 4 and 5. Here the pinion blank 30 whose pitch cone apex is at 37 is set to its pitch angle $g$ and the rotary cutter 31 employed represents a basic gear 36, in this case a true crown gear, namely, a gear whose pitch surface is a plane. For generating the tooth surfaces of the blank, the cutter 31 is rotated about its axis 33 while the pinion blank, is rotated on its axis 34 and simultaneously a relative rotary movement is imparted between the tool 31 and the blank 30 about an axis 35 representing the axis of a basic gear 36, the pinion blank axis 34 being maintained all the while in offset relation to the axis 35. After a tooth surface of the blank has been completely generated, the blank will be indexed and the operation will proceed as before. The alternate generation and indexing will be continued until all of the tooth surfaces of the blank have been finished. The pinion may be cut on a machine such as described in my copending application, Serial No. 77,310 filed December 23, 1925.

By the method described, both members 10 and 11 of a pair of hypoid gears, constructed according to this invention will be provided with tooth surfaces which are molded-generated, that is, of compound reproduction configuration.

In cutting the gear, the teeth are preferably cut "spread blade", that is, two adjacent tooth surfaces are finished cut simultaneously. This may be accomplished with a rotary annular face mill provided with a plurality of cutting edges, certain of which are adapted to finish cut one side face of the blank and others of which finish cut an adjacent side tooth surface of the blank. In cutting the pinion, one tooth surface is preferably cut at a time, that is, one tooth surface is cut on each of the teeth of the blank and then the blank and tool are reset relatively to each other to cut the opposite faces of all of the teeth.

It will be noted that in generating both gear and pinion, the axis of the blank being cut is inclined to the axis of the basic gear, with which it is rolled during cutting, at a angle different from the angle at which the axes of gear and pinion are inclined to each other, this latter angle being, as previously stated, a right angle in the preferred embodiment of the invention. In other words, the basic gear, in each case, has a pitch angle different from the pitch angle of the gear with which the gear being cut is to mate.

Hypoid gears mesh with a combined rolling and sliding action. This combined rolling and sliding action, when the gears are properly designed, makes for long life and tends to preserve throughout the life of the gears the desired tooth forms. It has been determined that a pair of hypoid gears will have the requisite strength and the desired mesh when they are so proportioned as to contact along the entire length or substantially along the entire length of the tooth surface of one member of the pair. It has been found that the desired tooth surface contact can be realized when the line of action between the gears extends substantially in the direction of the pinion axis, namely, when the gears are so proportioned that in development in a plane tangent to their pitch surfaces at a mean contact point they mesh substantially along the projected pinion axis. Gears constructed according to the present invention, therefore should be so proportioned that their line of action extends substantially in the direction of the pinion axis projected into the common tangent plane.

Figure 6:
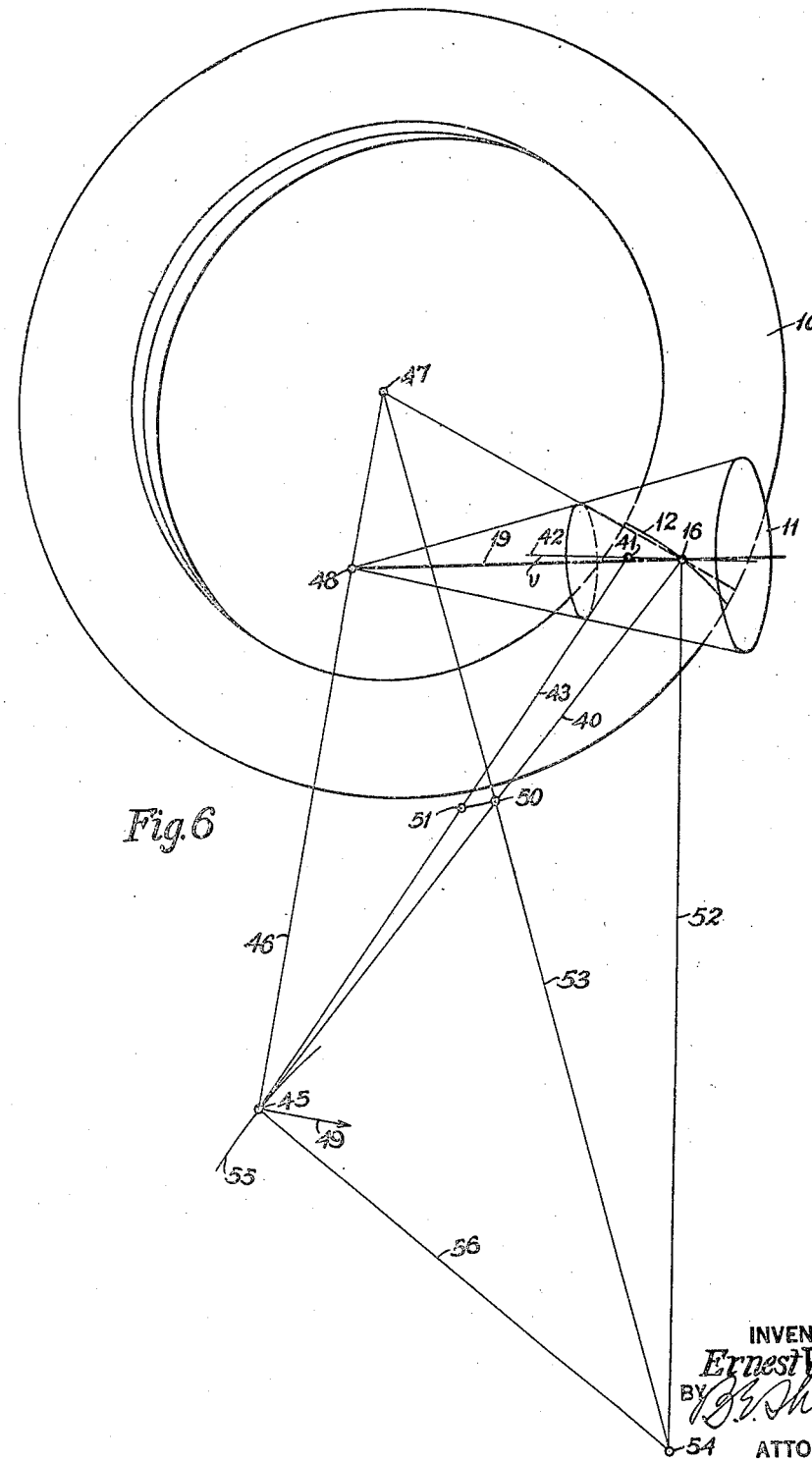
Figure 6 is a diagrammatic view, taken at right angles to the pitch plane of the hypoid pair, showing diagrammatically certain relationships between the members of the pair.

The pitch surfaces of the gear 10 and the pinion 11 are substantially conical. 17 indicates a plane which is tangent to the pitch surfaces of the two gears 10 and 11 at a point of contact 16 which is located about in the center of the face of the gear. The plane 17 will hereinafter be referred to as the pitch plane. In Figures 1, 2 and 6, the axes of gear and pinion projected into the tangent plane 17 are indicated at 18 and 19 respectively. The projected axes 18 and 19 intersect in the contact point 16.

Having described the method of producing a pair of hypoid gears according to this invention we must now determine how to proportion the gear pair so as to secure the desired mesh. Preferably the line of action will be so determined that the two sides of the teeth will mesh along the same line, which is the case, when the spiral angle or inclination angle of the teeth is the same on both sides. If afterwards it should be desired to cut one member of the pair "spread blade", the necessary corrections can be made in the same way as when cutting spiral bevel gears.

We know that in order that gear and pinion should transmit uniform motion, the moments acting on the two gears must be maintained in a constant proportion all along the line of action between the two gears. The forces acting on a pair of gears act in a direction perpendicular to the teeth of said gears, that is, in the direction of the tooth normals. Now the forces acting on the teeth in the direction of the normals can be resolved into two components, one, perpendicular to the pitch plane at any point of contact between the gears and the other lying in the pitch plane and extending in the direction of the normal projected into said plane. If the moments produced by these individual components are maintained in the case selected, individually in the proportion of the total moments acting on the two gears, that is, in the proportion of the respective tooth numbers of the pair, uniform motion can be secured.

It is obvious that at the point 16, which is the point of intersection of the projected axes of gear and pinion in the pitch plane, the vertical component of tooth pressure will not exert any turning moment on the gears 10 and 11. It is also obvious that at any other point of contact between the two gears which lies outside the point 16 and on the projected pinion axis 19, there will be no turning moment exerted on the pinion while there will be a turning moment exerted on the gear. Consequently the turning moments exerted on gear and pinion will be in a different ratio from their tooth numbers. Consequently in order that a pair of gears, constructed according to this invention, transmit uniform motion, it is necessary that their line of action lie, outside the projected pinion axis. It must be some line along which the moments exerted on gear and pinion at all points of contact between the gears, will be in the proportion of the tooth numbers of the pair. Our first problem, therefore, is to determine a correct line of action for a pair of gears constructed according to this invention.

Referring to Figure 6, 40 indicates the projection of a normal to the tooth 12 at the point of contact 16 between this tooth and a pinion tooth. Let 41 represent a point of contact other than the point 16 on the line of action 42 whose position is to be determined. 43 is the projection of a normal to the tooth curve at the point 41. The forces acting on gear and pinion, as previously stated, can be resolved into a component perpendicular to the pitch plane 17 and into a component extending along the projection 43 of the tooth normal into that pitch plane. Let us consider, first of all, the moments in the pitch plane. The moments transmitted to the gear and pinion by a force extending along any line 43 in the pitch plane will be at a constant ratio when the line 43 passes through the intersection point 45 of the normal 40 with the line 46 connecting the gear apex 47 with the pinion apex 48. That this is so is evident when the force along the line 43 is decomposed into a component extending along the connecting line 46 and into a component perpendicular to said line and extending in the direction 49 and passing through the point 45. The first component, namely that extending along the line 46, produces no turning moment, inasmuch as it intersects the axes of the two gears. The second component, namely that extending in the direction 49 naturally produces moments of constant ratio in all imaginable cases. Hence it is evident that a constant ratio between the two gears can be secured if the gears are so proportioned as to mesh along some line of action such that the tooth normals at different contact points, when projected into the pitch plane, intersect in a common point 45 as above described.

The line of action 42, must fulfill a further requirement namely that the components of the tooth pressures which are perpendicular to the pitch plane 17 should produce on the gear and pinion moments in the ratio of the tooth numbers. Let:

$G, g$ = the pitch angles of gear and pinion respectively, that is, the inclination angles of their axes to the pitch plane 17.

$S$ = the distance of any considered point 41 on the line of action from the point 16.

$Q, q$ = the distances of the point 45 from the gear and pinion apexes respectively, that is, the distances 47—45 and 48—45.

$u$ = the angle between the line of action 42 and the projected pinion axis 19.

$e$ = the angle between the projected axes 18 and 19.

$a$ = the normal pressure angle.

$P$ = the component of tooth pressure in the pitch plane.

$P \tan a$ = the component of tooth pressure perpendicular to the pitch plane.

$N, n$ = the tooth numbers of gear and pinion respectively.

$hp, hg$ = the spiral angles of pinion and gear respectively, $(hp - hg = e)$.

As previously stated, the component of tooth pressure perpendicular to the pitch plane at the point 16 exerts no turning moment on either gear or pinion because the point 16 is the point of intersection of the projected gear and pinion axes 18 and 19. The component of tooth pressure perpendicular to the pitch plane at any other point 41 of the line of action 42 produces the following moments or torques on gear and pinion respectively:

$$P \tan a . S . \sin (e-u) \cos G$$

and $$P \tan a . S . \sin u . \cos g.$$

To transmit uniform motion these moments must also be proportional to the tooth numbers $N, n$. Whence:

$$P \tan a . S . \sin (e-u) \cos G : P \tan a . S . \sin u . \cos g = N : n$$

and $$\frac{\sin (e-u)}{\sin u} \cdot \frac{\cos G}{\cos g} = \frac{N}{n}$$

By transformation:

$$\frac{\sin (e-u)}{\sin u} = \frac{\sin e . \cos u - \cos e . \sin u}{\sin u} = \sin e . \cotan u - \cos e.$$

Whence:

$$\sin e . \cotan u - \cos e = \frac{N}{n} \cdot \frac{\cos g}{\cos G}.$$

And:

$$\cotan u = \cotan e + \frac{N}{n} \cdot \frac{\cos g}{\cos G} \cdot \frac{1}{\sin e} \quad (1)$$

This equation gives the angle $u$, which is the angle between the required line of action 42 and the projected pinion axis 19, and hence gives us the direction of the required line of action 42 between gear and pinion.

Adverting again to the horizontal components of the tooth moments, that is to the pitch plane components of the tooth load which extend along the line 43, it will be found that these are in the ratio $$\frac{P.Q. \sin G}{P.q. \sin g}$$

As previously stated, these pitch plane components of tooth pressure must also be in the ratio of the tooth numbers of the two gears in order to transmit uniform motion. Hence:

$$\frac{\sin G}{\sin g} = \frac{N}{n} \cdot \frac{q}{Q} \quad (2)$$

If, as usual, the axes 14 and 15 of the two gears are disposed at right angles, the following relation between the pitch angles $G$, $g$ and the angle $e$ should exist, as may be determined with the known means of descriptive geometry:

$$\tan G . \tan g = \cos e. \quad (3)$$

As has been previously described, the gear is generated preferably in the same manner as a spiral bevel gear, namely by a rolling movement about its apex 47. In this method of generation the circular curve of the cutter is transmitted to the pitch surface of the gear.

Having determined the location of the line of action 42 and of the point 45 of intersection of the normals, it is possible by the known methods of descriptive geometry to determine the location of the center of tooth curvature with reference to the line of action, that is, the required cutter radius, so as to secure a tooth curvature which will give the required tooth contact. For, in curved tooth gears, the tooth curvature must be such that the projected normals, such as 40 and 43, to the tooth curves along the line of action should intersect in the point 45. Instead of determining the location of the center of tooth curvature from the location of the point 45, it is obvious that we can assume instead the cutter radius and determine the point 45.

The steps employed in determining the location of the center of tooth curvature or the location of the point 45, when one or other of these factors is known, will be clearer if we start from an assumed cutter radius or center of tooth curvature and show the relationship between this cutter radius or center of tooth curvature and the point 45. Let us assume a cutter radius $r$ such that the center of tooth curvature of the tooth 12 lies at the point 50 on the normal 40. When the point of contact between the gears has moved to the point 41 of the line of action, the center of tooth curvature will have moved, about the axis 47 of the gear, from 50 to 51, the distance 41—51 being plotted equal to $r$. The line 43 connecting the points 41 and 51 accordingly will be the tooth normal at the point 41. In this regard it is to be noted that the radius $r$ is substantially the same whether the actual gear 10 is considered or the corresponding crown gear whose axis is perpendicular to the pitch plane 19 and passes through the apex 47.

With our premise that the forces acting along the line 43 must produce moments of a constant ratio, it will be seen that this normal 43 must intersect the normal 40 in the point 45. Hence, from an assumed cutter radius, that is, a center of tooth curvature, the point 45 may be determined and conversely from the point 45 the center of tooth curvature may be determined.

Inasmuch as very small distances S are considered, the movement of the normal from the position 40 to the position 43 may be regarded as an elementary motion, that is, as a turning motion about an instantaneous center. The end point 16 of the normal moves on the line 42. Hence the instantaneous axis of said motion must be on a line 52 drawn perpendicular to the line of action 42 at the point 16. Furthermore the point 50 of said normal moves about the gear apex 47 at right angles to the line 53, connecting the center of curvature 50 with the apex 47. The instantaneous axis must, therefore, also lie on said line 53. That is to say, the instantaneous axis lies at the intersection 54 of the lines 52 and 53. The two positions 40 and 43 of the considered normal, are, therefore, at a constant distance from the instantaneous axis 54 and hence are tangent to a circle 55 drawn about the axis 54 as a center.

Adjacent tangents intersect between their points of tangency. Since the distance S is very small, the tangents 40 and 43 will intersect in a point which practically coincides with the point 45 of tangency of the line 40. The point 45 can, therefore, be located by drawing a perpendicular 56 to the line 40 from the instantaneous center 54.

From the relation just described, either the point 45 may be determined from a known cutter radius $r$ or the cutter radius $r$ may be determined from a known or assumed point 45.

Summing up, one way of procedure in dimensioning a pair of gears constructed according to this invention is as follows:

(1) Angle $e$, the angle between the projected gear and pinion axes, and the spiral angle $hp$ of the pinion are assumed. ($hg = hp - e$).

(2) The pitch angles $G$ and $g$ of gear and pinion, the angle $u$, the angle between the required line of action and the projected pinion axis, and the location of the gear and pinion apexes, 47 and 48, are then determined from equations (1), (2) and (3).

(3) The lengthwise curvature of the gear teeth or in other words, the radius of the cutter is now determined in the manner already described. That is, by drawing line 56 through point 45 perpendicular to line 40, by drawing line 52 through the contact point 16 perpendicular to the line of action 42, and by connecting the intersection point 54 of the lines 52 and 56 with the gear apex 47 by a line 53. The point where this line 53 intersects the normal 40 is the center 50 of tooth curvature and the distance 16—50 equals the sought cutter radius $r$.

In producing curved tooth hypoid gears according to this invention, rotary face mills are preferably used. These tools are constructed with fixed diameters, that is, in fixed sizes, though some means of adjustment is ordinarily provided for varying the center distances of the individual cutter blades and in this way some adjustment of the cutter radius is possible. Usually the cutter radius $r$ obtained from the procedure described above is somewhat different from the predetermined cutter radius, that is, from the radius of an existing cutter. In this case, the radius of the cutter may be changed slightly by adjusting the blades inwardly or outwardly of the cutter axis, as by shimming. However, it is generally preferable to maintain the predetermined cutter radius and change some one of the other gear dimensions. Thus one of the pitch angles, $G$ or $g$ may be changed by a small amount. The other dimensions conforming to this changed dimension will again be derived as already described. It is likely that a cutter radius slightly different from an existing cutter radius will be again obtained. The final data of the pair of gears can now be determined, however, by interpolating the two results obtained, so as to have the tooth curvature conform to a predetermined cutter radius.

As previously stated, the gear is produced preferably in the same manner as a spiral bevel gear. Preferably the gear will be cut with a rotary annular face mill. It will be understood, however, that it may be produced by any and all methods applicable to the production of spiral bevel gears, such as by hobbing with face hobs or taper hobs, or by planing, etc.

The pinion or smaller member of the pair is, as previously stated, preferably produced in a generating process in which the blank and tool are rolled relatively to each other in the manner of a gear rolling on a crown gear whose axis is offset from the axis of the pinion blank, one tooth or one tooth side of said crown gear being represented by the tool. If desired, the crown gear or basic gear for generating the pinion may be identical with or complementary to the crown gear from which the gear is generated. In this case, gear and pinion would be conjugate to the same crown gear or basic gear, or more accurately to complementary crown or basic gears. It is well known, that spiral bevel gears with intersecting axes when generated conjugate to complementary crown or basic gears will transmit uniform motion and will mesh with one another with line contact. Hypoid gears, however, which are conjugate to complementary crown gears are not fully conjugate to each other. That is to say, that while they transmit true uniform motion they will not contact along lines with each other but only in points, mathematically speaking. For this reason different crown gears or different basic gears are preferably used when generating the members of a pair of hypoid gears. The crown gear used in generating the pinion is preferably so selected that the pinion produced therefrom will mesh properly with its mate gear along the pitch lines of the two gears, in other words, the crown gear is so selected that the areas of the pinion teeth which extend along the pitch lines are truly conjugate to the corresponding areas of the teeth of the mate gear. The method by which the pitch line areas of the pinion teeth are so produced will now be described.

Figure 7:
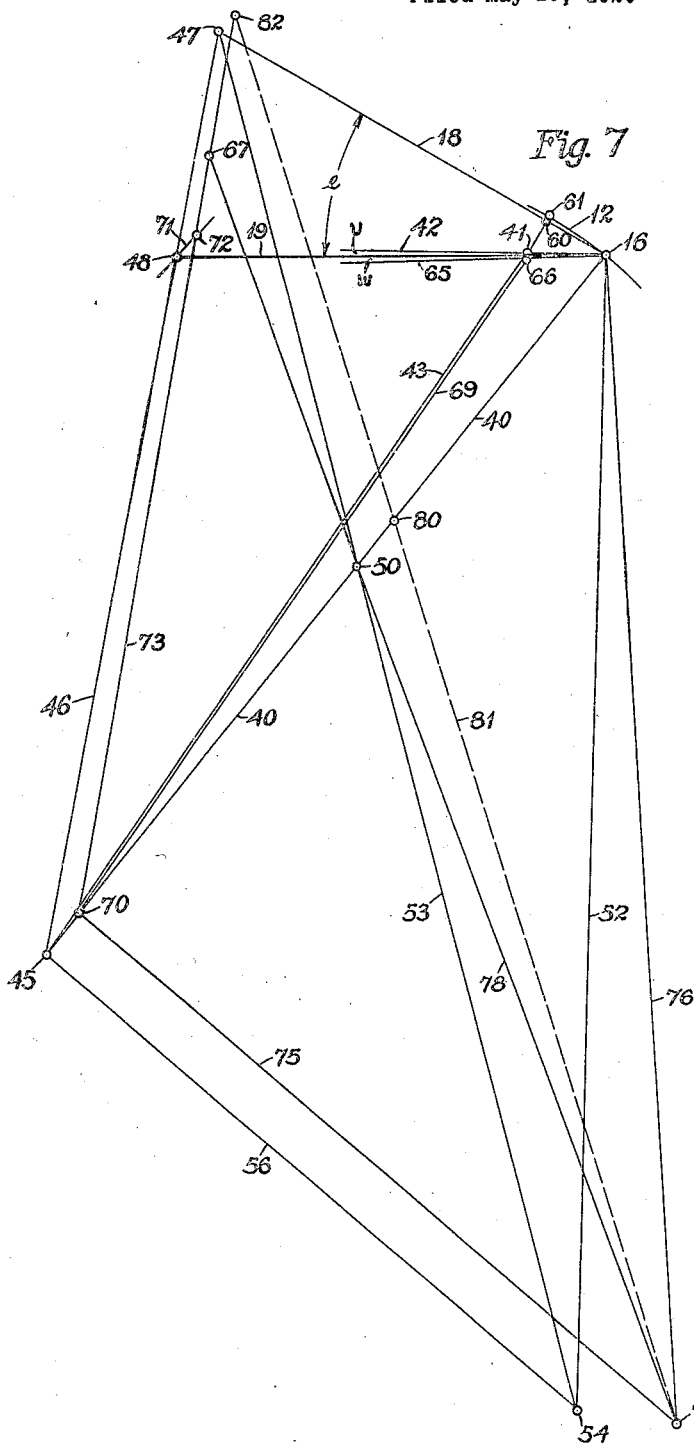
Figure 7 is a diagrammatic view showing the relationship between a pair of gears, constructed according to this invention, in the pitch plane.
Figure 8:
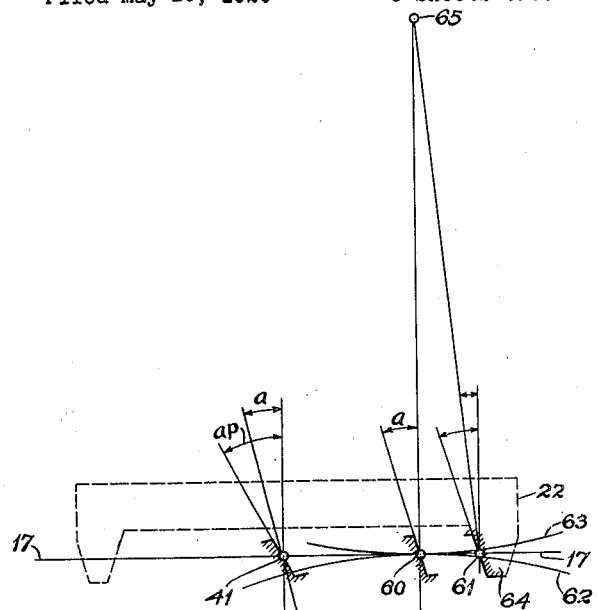
Figures 8 and 9 are diagrammatic views, further illustrative respectively, of the method of producing a gear and a pinion according to this invention.
Figure 9:
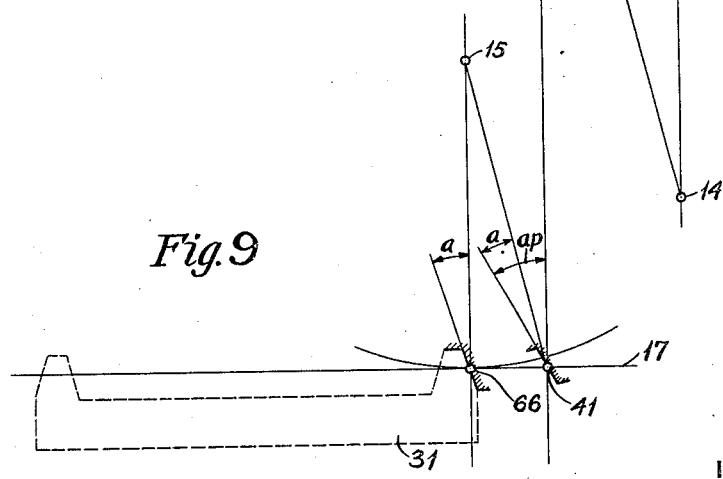

Referring now to Figures 7, 8 and 9. During the generation of the gear or larger member of the pair, the cutter 22 which represents the generating basic gear transmits its pressure angle $a$ to the gear along the pitch surface of the gear. At the points 16 and 60 the pitch cone surface of the basic gear employed in generating the gear or larger member of the pair is tangent to the pitch plane 17, the plane of the paper in Figure 7, and the true pressure angle of the gear equals the pressure angle $a$ of the cutter 22 referred to the pitch plane 17. This is true because the gear is produced like a spiral bevel gear by a rolling motion in which the blank rolls about its apex on a basic gear, such as a nominal crown gear, and the line of action between the gear blank and the basic gear extends along the projection 18 of the gear axis into the pitch plane.

The generating gear reproduces its pressure angle $a$ on the gear or larger member of the pair at corresponding points on the pitch surfaces 63 and 62 of the two gears. Therefore, the pressure angle of the hypoid gear referred to its own pitch surface 62 is the same at 60 and 41 as at 61. At point 41, however, the pitch surface 62 of the hypoid gear is not tangent to the pitch plane 17, see Figure 8, and the pressure angle $ap$ at the point 41 referred to the pitch plane 17 is accordingly different from the pressure angle $a$ at this point when referred to the pitch surface 62 of the gear. At point 60 the two pitch surfaces 17 and 62 are mutually tangent and the pressure angle is the same referred to either surface. By turning the point 61 about the axis 14 of the gear until it reaches the point 41 the pressure angle at the point 41 as referred to the pitch plane can be determined by the known methods of descriptive geometry. It should be noted that Figures 8 and 9 are exaggerated showings. In reality the distance between point 41 and the point 60 and between point 41 and the point 66 is very small and the distance of point 41 from the pitch surface 62 can be neglected as compared with distance 60—41.

From what has just been said, it will be apparent that the pressure angle of the gear referred to the pitch plane 17 is different at the point 41 from its pressure angle referred to the same plane at the point 16. This difference must be taken into account in producing the pinion in order that gear and pinion when in mesh should transmit uniform motion. It is to be noted that in generating the pinion, the imaginary generating gear is a true crown gear with a plane pitch surface. If the line of action between this generating crown gear and the pinion being cut were along the line 42 the pinion would have the same pressure angle at point 41 as at point 16 and accordingly would not match the gear which, as has just been explained, has a different pressure angle at point 41 from that at point 16. The pinion must be generated, therefore, along some other line of action, such as the line 65, making an angle $w$ with the projected pinion axis 19, such that when the pinion has been generated with a pressure angle at the point 66 of this line of action equal to the pressure angle $a$ of the cutter 31, the relative rotation of the pinion from point 66 to point 41 will result in changing the pressure angle of the pinion, as referred to the pitch plane 17, to the same pressure angle $ap$ as that of the gear at the point 41, whereby the gear and pinion may match each other all along the line of action 42. This point 66 can be determined with the known methods of descriptive geometry by turning the point 41 about the axis 15 of the pinion until it reaches a point 66 where the pressure angle referred to the pitch plane equals that of the cutter 31. In this way the line of action 65 between the pinion and its generating gear may be so determined that the pinion will mesh properly with its mate gear along a line of action 42. The above discussion is based particularly upon the use of a spherical cutter, that is, a tool having cutting blades of circular profile, but the basic principles involved are equally applicable to straight sided, i. e., conical cutting tools. In either case, a different line of action must be found for generating crown gear and pinion from that between the two gears in order that the teeth of the two gears match along the line of action 42.

Having thus determined the line of action 65, the next step is to determine the location of the center of the crown gear in such way that mesh between the crown gear and the given pinion actually takes place along the line 65. In determining the location of the crown gear axis 67, use is again made of the fact that forces acting along known tooth normals must produce turning moments on pinion and crown gear which are at a constant ratio. From the line of action the position of the normals 40 and 69 at the points of contact 16 and 66 on the line of action 65 between the crown gear and pinion can be determined. These normals intersect in some point, as the point 70, which is usually different from the point 45. The location of the point 70 can be determined from the known location of the tooth normals along line of action 42, by the known methods of descriptive geometry by turning the tooth normals about the axis of the pinion until the point 41 has moved to the point 66 and determining the intersection point 70 of the normal in the new position 69 with the normal 40.

It has been determined that the center or apex of the generating crown gear must lie on some straight line in the pitch plane to effect mesh along the line of action 65. The position of this straight line can be determined as follows: Line 71 is drawn through the apex 48 of the pinion parallel to the normal 40. A distance B' is laid off on this line 71 so that:

$$B' = B \frac{\sin w}{\cos (hp+w)} \cdot \frac{\tan a}{\tan g}$$

In this formula $w$ is the angle between the line of action 65 and the projected pinion axis 19 and B is the distance 16—70. The other symbols have been introduced previously. The distance B' has been plotted in Figure 7 equal to the distance 48—72. The center of the crown gear should lie on the line 73 connecting the points 70 and 72. Another line on which the center of the crown gear should lie is determined by the principles previously explained in connection with the determination of the relationship between the intersection point 45 and the center of tooth curvature 50. Line 75 is drawn through the point 70 at right angles to the projected tooth normal 40 and line 76 is drawn through the contact point 16 at right angles to the line of action 65. The intersection point 77 of these lines 75 and 76 is thus the instantaneous axis of the normal for the line of action 65. By drawing a line 78 through the center of tooth curvature 50 and intersecting this line with the line 73 previously determined, the center 67 of the crown gear can be located.

The direction of the plotting distance B' indicated in Figure 7 corresponds to the concave sides of the pinion teeth. This distance should be plotted in the opposite direction for the convex sides of the teeth. Usually the location of the point 41 is different for the two tooth sides and usually, therefore, the crown gear center 67 is different for the two tooth sides. In order, therefore, to have the two sides of the teeth of gear and pinion mesh along the same line of action 42, as in the preferred embodiment of the invention, it is necessary to use different crown gears for generating the opposite sides of the pinion teeth.

It is usually found that a crown gear determined by the method just described will produce a pinion whose transverse tooth profiles are curved more than necessary for transmitting uniform motion to the gear. The transverse tooth profiles of such a pinion will, therefore, not make contact to their full depth with the tooth profiles of the mating gear. While this feature makes the pair of hypoid gears less sensitive to misalignment it is frequently not desirable because it reduces the load carrying capacity. Differently curved profiles may be obtained on the pinion teeth by using a crown gear having a different offset but whose center lies on the line 73 previously determined. In this case, a cutter of a slightly different diameter from the cutter used on the gear will be employed. For instance a cutter having a radius 16—80 may be used on the concave sides of the pinion teeth. In this case the center of the crown gear which was previously determined as lying at 67 will now lie at the intersection of the line 73 with a line 81 drawn from the instantaneous axis 77 and passing through the center 80 of the pinion tooth curvature, that is, it will be at the point 82.

The ratio between crown gear and pinion is so determined that the component of tooth pressure which is perpendicular to the tooth surfaces at point 16 is equal on crown gear and pinion. This ratio is found to be equal to the ratio of the distances 70—82 and 70—72, divided by the sine of the pitch angle $g$ of the pinion, the sine of the pitch angle of the crown gear equaling, of course, 1. Thus the ratio is:

$$\frac{70-82}{70-72} \cdot \frac{1}{\sin g}$$

The offset of the new crown gear axis 82 from the projected pinion axis 19 is larger than the offset of the crown gear axis 67 from the pinion axis 19, in the drawing. Broadly the larger the offset between the axes of the pinion and the generating crown gear the flatter the tooth profiles are on the concave sides of the pinion teeth and the smaller the offset the more curved these profiles are. On the convex sides of the pinion teeth, the profiles are the more curved, the larger the offset, and the flatter, the smaller the offset. This relationship makes it possible to produce tooth profiles on the pinion of any desired curvature and is important inasmuch as a pair of hypoid gears, in use, must not only be able to run properly together in their theoretically correct position but must also be capable of some adjustment or deviation from this theoretically correct position. Any necessary or suitable deviation from the theoretical tooth profiles can accordingly be readily obtained by using a generating crown gear which is suitably offset from the pinion blank axis.

Changes in the longitudinal tooth curvature or any desired matching or mismatching of the teeth of the gears longitudinally may be obtained in the usual way by slightly changing the diameter of the pinion cutters. Changes in the pressure angle of the pinion may be effected by changing the cutter inclination. Changes in the lengthwise tooth inclination or spiral angle may be obtained by the usual methods employed in cutting curved tooth gears. The spiral angle of the pinion is always made larger than the spiral angle of the gear as it has been found that this construction permits of making the pinion larger and hence of greater strength than a bevel pinion of a corresponding ratio.

In general, it will be found that the method of producing gears according to the present invention is extremely flexible and permits of a great variety of modifications at will. The tooth bearing, that is, the working area of the teeth can be made to extend any desired length on the teeth to allow for an elastic or rigid mounting as may be desirable. It can also be made to extend any desired length on the tooth profiles without changing the cutter. Moreover the center of the tooth bearing can be placed anywhere on the tooth surface by small adjustments of the machines employed in producing the gears. The tooth bearing can be made to extend in any desired direction. Preferably it is made to extend along the pitch line, that is lengthwise of the teeth at the pitch surface. This form of bearing does away with the bias bearing or oblique bearing which is frequently found a source of trouble, though, if desired the bearing may be made bias.

While the present invention has been described particularly with reference to the production of longitudinally curved tooth gears, it will be understood that this invention is applicable also to the production of gears in which one member of the pair has straight teeth either radial or skew. It will be understood also that this invention is applicable to the grinding and lapping of gears and that when the term "cutting" is employed it is intended to cover these methods of production also.

In general, it may be said, that, while I have illustrated one preferred embodiment of my invention, the invention is capable of further modification within its limits and the scope of the appended claims, and that this application is intended to cover any variations, uses, or adaptations of my invention, following, in general, the principles of the invention and including such departures from the present disclosure as come within known or customary practice in gear cutting and may be applied to the essential features hereinbefore set forth and as fall within the scope of the appended claims.

Having described my invention, what I claim is:

1. The method of producing a hypoid gear which consists in cutting its side tooth surfaces by effecting a relative cutting motion between a tool and a gear blank while imparting a relative rolling motion between said tool and blank in the manner of a gear meshing with a basic gear with its axis non-intersecting and non-parallel to the axis of said basic gear, said basic gear having a pitch angle different from the pitch angle of a mate gear.

2. The method of producing a hypoid gear which consists in cutting its side tooth surfaces by effecting a relative cutting motion between a tool and a gear blank while imparting a relative rolling motion between said tool and blank in the manner of a gear meshing with a crown gear with its axis non-intersecting and non-parallel to the axis of said crown gear.

3. The method of producing a hypoid gear which consists in cutting its side tooth surfaces by moving a tool in a curved path across the face of a gear blank while imparting a relative rolling motion between said tool and blank in the manner of a gear meshing with a basic gear with its axis non-intersecting and non-parallel to the axis of said basic gear, said basic gear having a pitch angle different from the pitch angle of a mate gear.

4. The method of producing a hypoid gear which consists in cutting its side tooth surfaces by rotating a tool, having a plurality of annularly arranged cutting blades, in engagement with a gear blank while imparting a relative rolling motion between said tool and blank in the manner of a gear meshing with a basic gear with its axis non-intersecting and non-parallel to the axis of said basic gear, said basic gear having a pitch angle different from the pitch angle of a mate gear of the pair.

5. The method of producing a hypoid gear which consists in cutting its side tooth surfaces by moving a tool in a curved path across the face of the gear blank while imparting a relative rolling motion between said tool and blank in the manner of a gear meshing with a crown gear with its axis non-intersecting and non-parallel to the axis of said crown gear.

6. The method of producing a hypoid gear which consists in cutting its side tooth surfaces by rotating a tool, having a plurality of annularly arranged cutting blades, in engagement with a gear blank while imparting a relative rolling motion between said tool and blank in the manner of a gear meshing with a crown gear with its axis non-intersecting and non-parallel to the axis of said crown gear.

7. The method of producing the side tooth surfaces of one of a pair of hypoid gears having their axes disposed at right angles, which consists in effecting a relative cutting motion between a tool and a gear blank while rotating the blank on its axis and simultaneously imparting a relative turning movement between the tool and blank about an axis offset from the blank axis but inclined thereto at an acute angle.

8. The method of producing the side tooth surfaces of one of a pair of hypoid gears having their axes disposed at right angles, which consists in moving a tool in a curved path across the face of a gear blank while rotating the blank on its axis and simultaneously imparting a relative turning movement between the tool and blank about an axis offset from the blank axis but inclined thereto at an acute angle.

9. The method of producing the side tooth surfaces of one of a pair of hypoid gears having their axes disposed at right angles, which consists in selecting a tool, having a plurality of annularly arranged cutting blades, and rotating said tool in engagement with a gear blank while rotating the blank on its axis and simultaneously imparting a relative turning movement between the tool and blank about an axis offset from the blank axis but inclined thereto at an acute angle.

10. The method of producing a pair of hypoid gears which consists in producing the side tooth surfaces of one member of the pair by effecting a relative cutting movement between a tool and a gear blank while simultaneously imparting a relative rolling movement between said tool and blank about an axis intersecting the axis of the blank, and in producing the side tooth surfaces of the other member of the pair by effecting a relative cutting movement between a tool and a gear blank while rotating the blank on its axis and simultaneously imparting a relative turning movement between said last named tool and blank about an axis offset from the blank axis.

11. The method of producing a pair of hypoid gears which consists in producing the side tooth surfaces of one member of the pair by moving a tool in a curved path across the face of a gear blank while simultaneously imparting a relative rolling movement between said tool and blank about an axis intersecting the axis of the blank, and in producing the side tooth surfaces of the other member of the pair by moving a tool in a curved path across the face of the gear blank while rotating the blank on its axis and simultaneously imparting a relative turning movement between said last named tool and blank about an axis offset from the blank axis.

12. The method of producing a pair of hypoid gears which consists in producing the side tooth surfaces of one member of the pair by rotating a tool, having a plurality of annularly arranged cutting blades, in engagement with a gear blank while simultaneously imparting a relative rolling movement between said tool and blank about an axis intersecting the axis of the blank, and in producing the side tooth surfaces of the other member of the pair by rotating a tool, having a plurality of annularly arranged cutting blades, in engagement with a gear blank while rotating the blank on its axis and simultaneously imparting a relative turning movement between said last named tool and blank about an axis offset from the blank axis.

13. The method of producing a pair of hypoid gears which consists in producing the side tooth surfaces of one member of the pair by moving a tool in a curved path across the face of a gear blank to simultaneously finish cut two adjacent tooth faces of the blank while simultaneously imparting a relative rolling movement between said tool and blank about an axis intersecting the axis of the blank, and in producing the side tooth surfaces of the other member of the pair by moving a tool in a curved path across the face of a gear blank to finish cut one side face of the blank at a time, while rotating the blank on its axis and simultaneously producing an added relative movement between tool and blank about an axis offset from the blank axis.

14. The method of producing a pair of hypoid gears which consists in producing the side tooth surfaces of one member of the pair by rotating a tool, having a plurality of annularly arranged cutting edges certain of which are adapted to finish cut one tooth side of a blank and others of which are adapted to finish cut an adjacent tooth face of the blank, in engagement with a gear blank while simultaneously imparting a relative rolling movement between said tool and blank about an axis intersecting the axis of the blank, and in producing the side tooth surfaces of the other member of the pair by rotating a tool, having a plurality of annularly arranged cutting edges, in engagement with a gear blank while rotating the blank on its axis and simultaneously producing a relative turning movement between said last named tool and blank about an axis offset from the blank axis.

15. The method of producing a pair of hypoid gears which consists in producing the side tooth surfaces of each member of the pair by effecting a cutting movement between a tool and a gear blank while simultaneously effecting a relative rolling movement between the tool used and the gear blank in the manner of a gear meshing with a basic gear other than the mate gear of the pair, the axis of one of said blanks being maintained, during said rolling movement, offset from the axis of the basic gear with which it rolls.

16. The method of producing a pair of hypoid gears which consists in producing the side tooth surfaces of each member of the pair by moving a tool in a curved path across the face of a gear blank while simultaneously effecting a relative rolling movement between the tool used and the gear blank in the manner of a gear meshing with a basic gear other than the mate gear of the pair, the axis of one of said gears being maintained, during said rolling movement, offset from the axis of the basic gear with which it rolls.

17. The method of producing a pair of hypoid gears which consists in producing the side tooth surfaces of each member of the pair by rotating a tool having a plurality of annularly arranged cutting edges, in engagement with a gear blank while simultaneously effecting a relative rolling movement between the tool used and the gear blank in the manner of a gear meshing with a basic gear other than the mate gear of the pair, the axis of one of said blanks being maintained, during said rolling movement, offset from the axis of the basic gear with which it rolls.

18. The method of producing one of a pair of hypoid gears which consists in cutting one side face of the teeth of said gear by moving a tool in a curved path across the face of the gear blank while simultaneously rolling said tool and blank relatively to each other in the manner of a gear meshing with a basic gear, other than its mate, with its axis non-intersecting and non-parallel to the axis of said basic gear and in cutting the opposite sides of the teeth of the gear by moving a tool in a curved path across the face of said blank while simultaneously rolling said last named tool and the blank relatively to each other in the manner of a gear meshing with a basic gear, other than the first basic gear and other than the mate gear, with its axis non-intersecting and non-parallel to the axis of said basic gear.

19. The method of producing one of a pair of hypoid gears which consists in cutting one side of the teeth of said gear by moving a tool in a curved path across the face of the gear blank while simultaneously rolling said tool and blank relatively to each other in the manner of a gear meshing with a crown gear with its axis offset from the axis of said crown gear, and in cutting the opposite sides of the teeth of the gear by moving a tool in a curved path across the face of said blank while simultaneously rolling said last named tool and blank relatively to each other in the manner of a gear meshing with a crown gear, different from the first crown gear, with its axis non-intersecting and non-parallel to the axis of said crown gear.

20. The method of producing one of a pair of hypoid gears which consists in cutting its side tooth surfaces by effecting a relative cutting movement between a tool and a gear blank while simultaneously producing a relative rolling movement between said tool and blank in the manner of a gear meshing with a crown gear, with its axis offset from the axis of the crown gear, along a line of action other than its line of mesh with a mate gear.

21. The method of producing one of a pair of hypoid gears which consists in cutting one side face of the teeth of said gear by effecting a cutting movement of a tool in engagement with a tapered gear blank while simultaneously imparting a relative movement between said tool and blank corresponding to that of a gear meshing with a basic gear, other than its mate, with its axis non-intersecting and non-parallel to the axis of said basic gear, and in cutting the opposite sides of the teeth of the gear by effecting a cutting movement of a tool in engagement with the blank while simultaneously producing a relative movement between the last named tool and the blank corresponding to that of a gear meshing with a basic gear, other than the first basic gear and other than the mate gear, with its axis non-intersecting and non-parallel to the axis of said basic gear.

22. The method of producing one of a pair of hypoid gears which consists in cutting one side face of the teeth of said gear by effecting a cutting movement of a tool in engagement with a tapered gear blank while simultaneously producing a relative movement between said tool and blank corresponding to that of a gear meshing with a crown gear with its axis offset from the axis of said crown gear, and in cutting the opposite sides of the teeth of the gear by effecting a cutting movement of a tool in engagement with the blank while simultaneously producing a relative movement between the last named tool and the blank corresponding to that of a gear meshing with a crown gear different from the first crown gear, with its axis non-intersecting and non-parallel to the axis of said crown gear.

ERNEST WILDHABER.